Dec. 19, 1933.  P. C. PETERSEN  1,940,013
METHOD OF TREATING FRUIT JUICES
Filed April 5, 1932
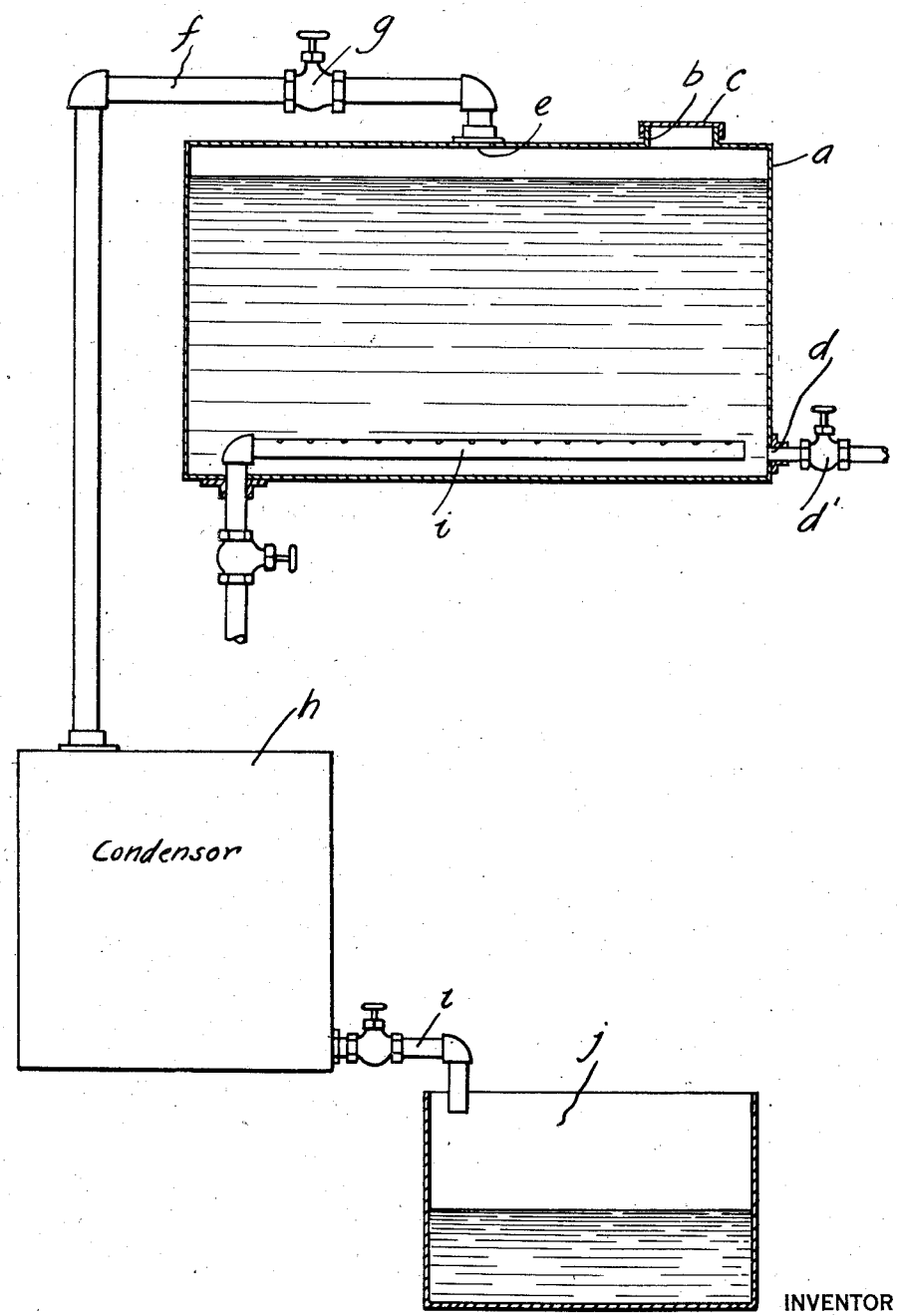
INVENTOR
Paul C. Petersen
BY
ATTORNEY Patented Dec. 19, 1933

1,940,013

UNITED STATES PATENT OFFICE 1,940,013

METHOD OF TREATING FRUIT JUICES

Paul C. Petersen, Hood River, Oreg.

Application April 5, 1932. Serial No. 603,312

4 Claims. (Cl. 99—15)

My invention has for its object the providing of an improved method of treating fruit juices, particularly apple cider, for clarifying them and preventing their turning into vinegar; but without destroying or affecting the natural flavor and aroma of the fruit, or without driving off the malic acid content.

Heretofore, various methods of treating cider to prevent it from turning to vinegar have been employed, such as by boiling the apple cider in an open vessel to drive off the acetic acid content and kill the vinegar (acetic acid) forming bacteria.

Such methods have been successful in so far as rendering the cider incapable of turning to vinegar are concerned, but they also drive off the natural fruit sugars and alcohols which hold the flavor and aroma and thus render the cider "flat" and unpalatable. Further, by such practice the malic acid content, which has a medicinal value and makes the cider a naturally healthful drink, is driven off.

Further, it is the general present practice to clarify and remove the sediment from the fruit juices by passing it thru a filter, but the filters employed are expensive, both as to initial cost and cost of maintainance; therefore the further object of my invention is to provide a method of treating fruit juices also adapted to clarify and remove the sediment from them without filtering.

My method consists in placing the cider in a closed vessel and heating the same to a temperature of approximately 245° F. and under a gauge pressure of approximately 5 pounds, for a period of approximately 90 minutes. During such period I permit the vapors arising from the cider to escape slowly thru a suitable outlet adjusted to maintain said pressure in the top of the vessel and condense the same.

By heating the cider to a temperature of approximately 245° F., I kill the acetic acid forming bacteria present in the cider and drive off any acetic acid content present, the acetic acid boiling at this temperature.

However, by carrying on the heating in a closed vessel and under a slight pressure of approximately 20 pounds to the square inch, I prevent violent ebullition of the cider, carrying off with it the natural fruit sugars and malic acid content.

At this temperature, considerable dry steam is thrown off from the cider. This dry steam collects with the vaporized acetic acid in the top of the vessel and serves as a blanket preventing the escape of the other components of the cider carried in suspension by the wet steam arising from the cider.

Such components comprise the natural fruit sugar and malic acid content. Thus the natural flavor and aroma of the cider is preserved.

Further, by condensing the vapors arising from the cider I save the acetic acid which constitutes a valuable by-product and by passing the escaping vapors thru a condensor, I can readily control the pressure and rate of escape of the vapor from the vessel, because of the resistance it imposes to the passage of the vapor therethrough.

I prefer to heat the cider by passing live steam thru it, since the live steam tends to break down the particles of pulp and foreign matter suspended in the cider and cause them to settle to the bottom of the retort as sediment and thus I clarify the cider without filtering.

I may, however, heat the cider by applying heat directly by suitable means to the vessel containing the cider, in which event I add approximately 5 per cent of water, which in turning to steam during the heating has substantially the same result, as passing the live steam thru the cider, causing the cider to throw down the particles of solid matter carried in suspension.

Finally, I allow the cider to cool and then bottle or store it in other air tight containers to prevent fermentation, since the natural sugars have not been removed, which would turn to alcohol on exposure to the atmosphere, but will not cause the formation of acetic acid, since the acetic forming bacteria have been killed during the heating period.

One form of apparatus I may employ in carrying out my method of treating fruit juices is hereinafter described with reference to the accompanying drawing.

In the drawing:

Fig. 1 shows diagrammatically a closed vessel $a$ provided with a filling inlet $b$ having a cover $c$ and an outlet $d$ at the bottom for removing the treated juices provided with a valve $d'$. The level to which I preferably fill the vessel $a$ with cider is also approximately shown in this figure.

An outlet $e$ is provided in the top of the vessel $a$ connected by a pipe $f$ having a valve $g$ therein, to a condensor $h$. A perforated pipe $i$ is provided in the bottom of the vessel $a$, connected with a source of steam, not shown.

The condensor $h$ is provided with an outlet $h'$, discharging into a suitable receptacle $j$.

After the vessel $a$ is filled with the cider to be treated as indicated, live steam is introduced thru the perforated steam pipe $i$ which the cider is heated to a temperature of approximately 245° F., killing the acid forming bacteria in the cider and driving off the acetic acid content, which may already have formed.

As mentioned, I carry on the heating for a period of approximately 90 minutes, and dry steam and the vaporized acetic acid which boils at 245° F. collects in the top of the vessel $a$ and escapes thru the outlet $e$, the dry steam serving as a blanket to prevent the escape of the more moist steam and other components of the cider and also serving to cause the precipitation of the solid particles of cider, thus clarifying the latter without filtering.

In order to maintain a light pressure of approximately 5 pounds to the square inch above atmospheric, in the vessel, I provide the valve $g$ to regulate the rate of escape of the steam and vaporized acetic acid.

By condensing the vapors escaping from the cider, I not only save the acetic acid content which is a valuable by-product, but I also provide a convenient means of controlling the escape of the vapors from the vessel $a$ due to the resistance imposed by the said condensor.

In the event I do not use steam for heating the cider, but do so by the direct application of heat, I add approximately 5 per cent of water at the beginning of the heating period, which in changing to steam effects the precipitation of the solid particles of the cider and clarifies it.

I claim:

1. A method of preserving cider consisting in heating the cider in a closed vessel to approximately a temperature of 245° F. for a period of about 90 minutes, and maintaining a constant pressure during the heating, whereby the acetic acid is driven off and the malic acid retained.

2. A method of preserving cider consisting in heating the cider in a closed vessel to approximately a temperature of 245° F. for a period of about 90 minutes, and maintaining a constant pressure of approximately 20 pounds per square inch during the heating, whereby the acetic acid is driven off and the malic acid retained.

3. A method of preserving cider consisting in heating the cider in a closed vessel to approximately a temperature of 245° F. for a period of about 90 minutes, permitting the volatile gases to escape, and condensing said escaping vapors to maintain a constant temperature, whereby the acetic acid is driven off and the malic acid is retained.

4. A method of preserving cider consisting in passing steam through the cider while in a closed vessel, heating the cider by said steam to approximately 245° F., subjecting said cider to said heating process for approximately 90 minutes, allowing the vaporzied gases to escape, condensing said vapors, thereby maintaining a constant pressure on the cider whereby the acetic acid is driven off and the malic acid retained.

PAUL C. PETERSEN.